United States Patent
Ito et al.

(10) Patent No.: US 10,988,081 B2
(45) Date of Patent: Apr. 27, 2021

(54) VEHICLE NOTIFICATION SYSTEM

(71) Applicant: Toyota Jidosha Kabushiki Kaisha, Toyota (JP)

(72) Inventors: Masaki Ito, Toyota (JP); Kihiro Kato, Tokoname (JP); Michio Ikeda, Nagoya (JP); Shotaro Inoue, Nissin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/657,173

(22) Filed: Oct. 18, 2019

(65) Prior Publication Data
US 2020/0122639 A1 Apr. 23, 2020

(30) Foreign Application Priority Data
Oct. 22, 2018 (JP) .............................. JP2018-198554

(51) Int. Cl.
| G08G 1/123 | (2006.01) |
| B60Q 9/00 | (2006.01) |
| G08G 1/133 | (2006.01) |
| G08G 1/0962 | (2006.01) |
| G05D 1/00 | (2006.01) |

(52) U.S. Cl.
CPC ........... *B60Q 9/00* (2013.01); *G08G 1/09626* (2013.01); *G08G 1/133* (2013.01); *G05D 1/0088* (2013.01); *G05D 2201/0213* (2013.01)

(58) Field of Classification Search
CPC ................... B60Q 9/00; G05D 1/0088; G05D 2201/0213; G08G 1/09626; G08G 1/133
USPC ......................................................... 340/988
See application file for complete search history.

(56) References Cited

U.S. PATENT DOCUMENTS

| 5,850,193 | A | * | 12/1998 | Shimoura | ............... | G01C 21/26 |
| | | | | | | 340/995.1 |
| 6,240,362 | B1 | * | 5/2001 | Gaspard, II | .......... | G01C 21/343 |
| | | | | | | 340/991 |
| 8,977,499 | B1 | * | 3/2015 | Prokhorov | ........... | G08G 1/0962 |
| | | | | | | 701/538 |
| 9,516,473 | B1 | * | 12/2016 | Haapanen | ............. | H04W 4/029 |
| 10,053,001 | B1 | * | 8/2018 | Nabbe | ....................... | B60Q 1/50 |
| 2002/0055818 | A1 | * | 5/2002 | Gaspard, II | .......... | G06Q 10/025 |
| | | | | | | 701/410 |
| 2004/0059500 | A1 | * | 3/2004 | Nakano | ............... | G01C 21/3676 |
| | | | | | | 701/431 |
| 2004/0210387 | A1 | * | 10/2004 | Friedrichs | ........ | G08G 1/096822 |
| | | | | | | 701/533 |

(Continued)

FOREIGN PATENT DOCUMENTS

| JP | 2014-002603 A | 1/2014 |
| WO | 2015145674 A1 | 10/2015 |

*Primary Examiner* — Naomi J Small
(74) *Attorney, Agent, or Firm* — Dinsmore & Shohl LLP

(57) ABSTRACT

A vehicle notification system performs audio notification regarding a driving status of a vehicle that is capable of self-driving, for an occupant of the vehicle at a predetermined timing during self-driving. The vehicle notification system includes a position identification section that is configured to identify a current position of the vehicle. Based on a destination and the current position, notification that the driving status is conforming to a plan is performed at regular intervals, and notification that the driving status is not conforming to the plan is performed if the driving status is no longer conforming to the plan.

5 Claims, 6 Drawing Sheets

(56) References Cited

U.S. PATENT DOCUMENTS

| | | | |
|---|---|---|---|
| 2011/0231354 A1* | 9/2011 | O'Sullivan | G08G 1/0104 |
| | | | 706/46 |
| 2012/0072107 A1* | 3/2012 | Okude | G01C 21/343 |
| | | | 701/416 |
| 2013/0006518 A1* | 1/2013 | Ozaki | G01C 21/3644 |
| | | | 701/411 |
| 2013/0338854 A1 | 12/2013 | Yamamoto | |
| 2016/0253901 A1* | 9/2016 | Rother | G08G 1/087 |
| | | | 701/117 |
| 2017/0151906 A1 | 6/2017 | Sakuma | |
| 2017/0240185 A1* | 8/2017 | Li | B60W 40/08 |
| 2018/0203455 A1* | 7/2018 | Cronin | G01C 21/3492 |
| 2018/0336007 A1* | 11/2018 | Li | G06F 3/167 |
| 2019/0235497 A1* | 8/2019 | Glebov | B60W 50/00 |

* cited by examiner

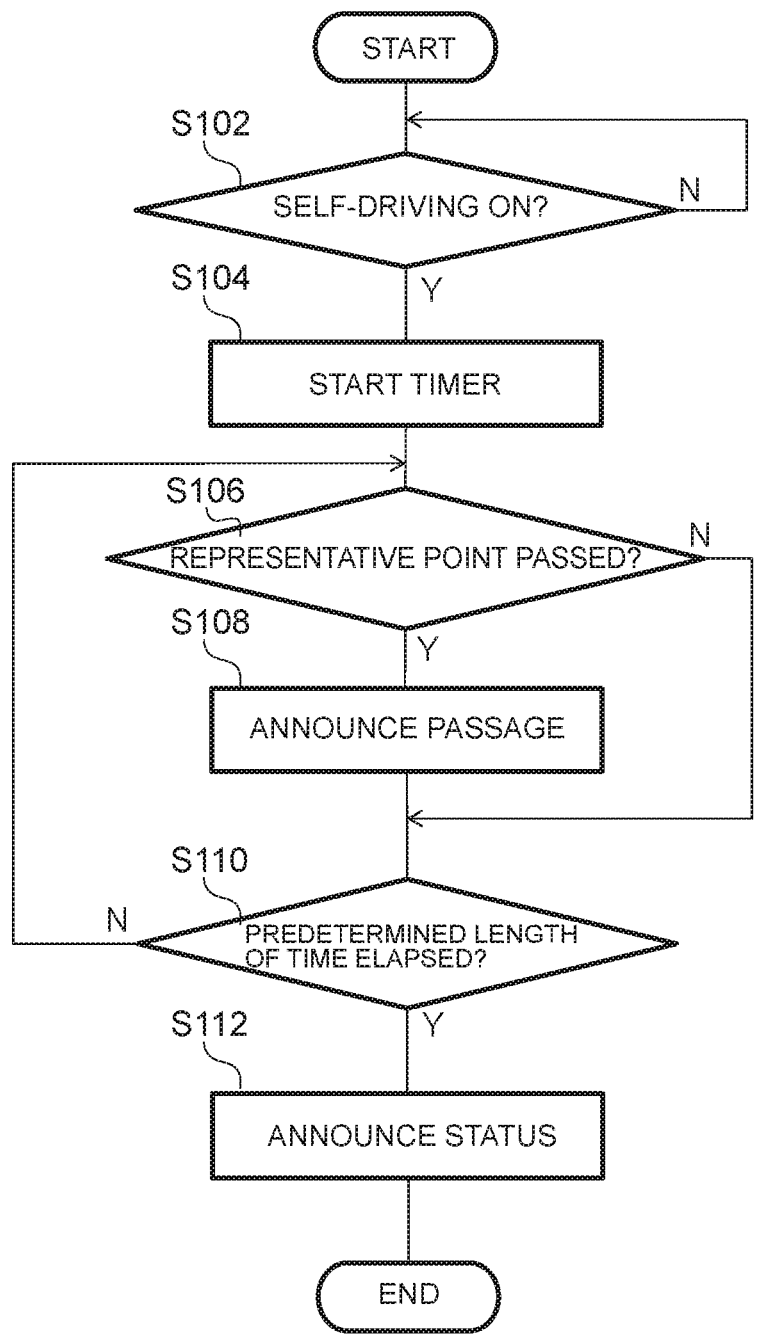

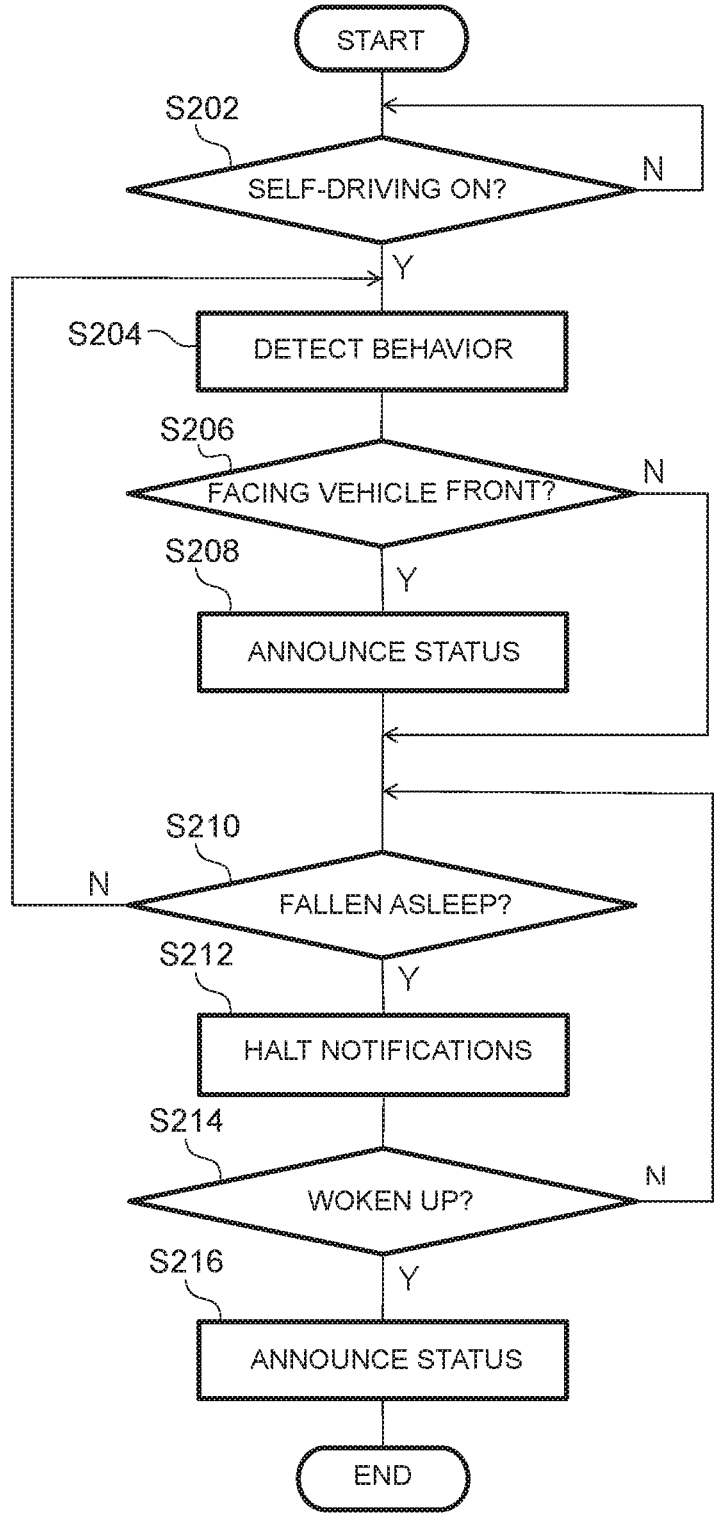

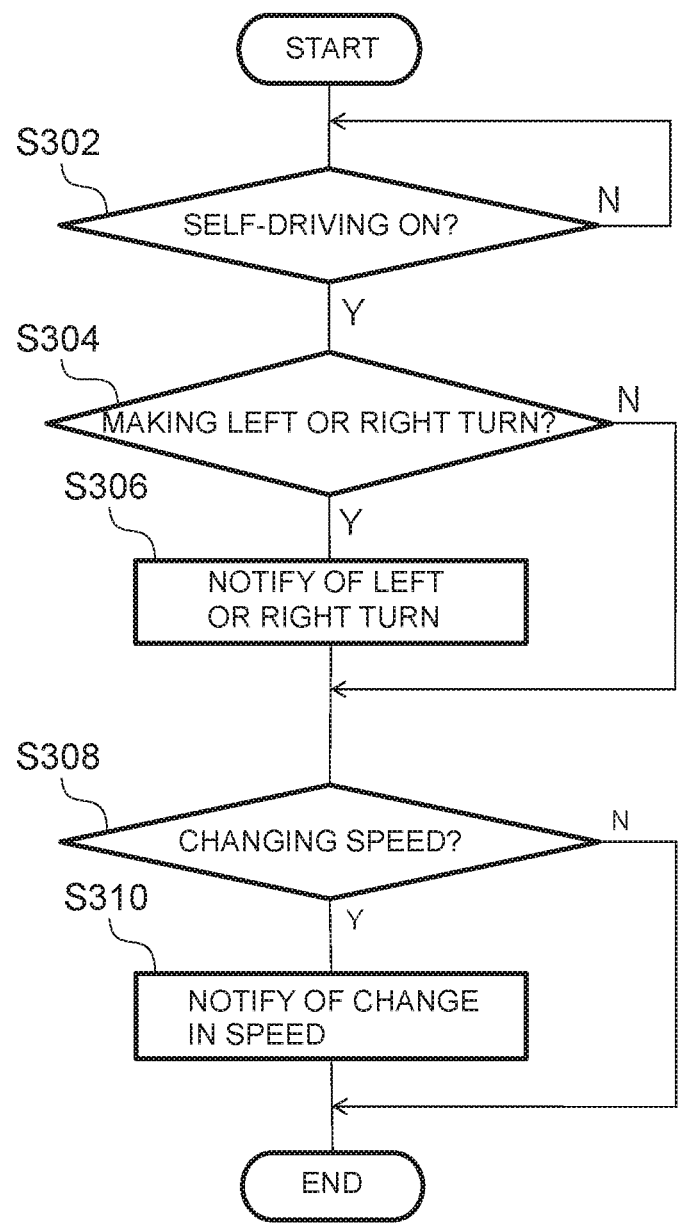

VEHICLE NOTIFICATION SYSTEM

CROSS-REFERENCE TO RELATED APPLICATION

This application claims priority under 35 USC 119 from Japanese Patent Application No. 2018-198554, filed on Oct. 22, 2018, the disclosure of which is incorporated by reference herein.

BACKGROUND

Technical Field

The present disclosure relates to a vehicle notification system.

Related Art

Japanese Patent Application Laid-Open (JP-A) No. 2014-002603 discloses a navigation system that displays operation information of a self-driving vehicle, such as a travel destination, a travel point, travel status, or transported items, on a display unit of a navigation terminal.

However, it is conceivable that an occupant might face toward a side of the vehicle or toward the vehicle rear side during self-driving, in which case it is possible that the occupant might not notice the driving status (operation status) displayed on the display unit. There is therefore room for improvement from the perspective of effectively notifying an occupant regarding a driving status.

SUMMARY

The present disclosure provides a vehicle notification system that may effectively notify an occupant regarding a driving status during self-driving.

A first aspect of the present disclosure is a vehicle notification system that performs audio notification regarding a driving status of a vehicle that is capable of self-driving, for an occupant of the vehicle at a predetermined timing during self-driving.

In the vehicle notification system of the first aspect, audio notification regarding the driving status of the vehicle is performed for the occupant during self-driving. Thus, the occupant may ascertain the driving status without looking at a display device such as a display unit during self-driving.

A second aspect of the present disclosure, in the first aspect, the vehicle notification system may further include a position identification section that is configured to identify a current position of the vehicle, wherein, based on a destination and the current position, notification that the driving status is conforming to a plan is performed at regular intervals, and notification that the driving status is not conforming to the plan is performed if the driving status is no longer conforming to the plan.

In the vehicle notification system of the second aspect, notification that the driving status is conforming to the plan is performed at regular intervals, the occupant may ascertain the driving status at regular intervals.

Moreover, the occupant is notified if the driving status is no longer conforming to the plan, the occupant may speedily perform changes to the travel route or schedule changes.

In a third aspect of the present disclosure, in the first aspect or the second aspect, the occupant is notified of at least one action of acceleration, deceleration, a right turn, or a left turn, prior to the at least one action being performed.

In the vehicle notification system of the third aspect, the occupant is notified in advance of at least one action of a change in speed or a left right turn, the occupant may prepare for the behavior of the vehicle.

A fourth aspect of the present disclosure, in any one of the first through third aspects, the vehicle notification system may further include an occupant behavior determination section that is configured to determine a wakefulness level of the occupant, wherein audio notification is halted if the occupant has been determined to have fallen asleep by the occupant behavior determination section.

In the vehicle notification system according to the fourth aspect, the occupant is not disturbed when sleeping.

BRIEF DESCRIPTION OF THE DRAWINGS

Exemplary embodiments of the present disclosure will be described in detail based on the following figures, wherein:

FIG. 4 is a flowchart illustrating a flow of notification processing according to an exemplary embodiment;

FIG. 5 is a flowchart illustrating a flow of notification processing according to a first modified example; and FIG. 6 is a flowchart illustrating a flow of notification processing according to a second modified example.

DETAILED DESCRIPTION

Figure 1:
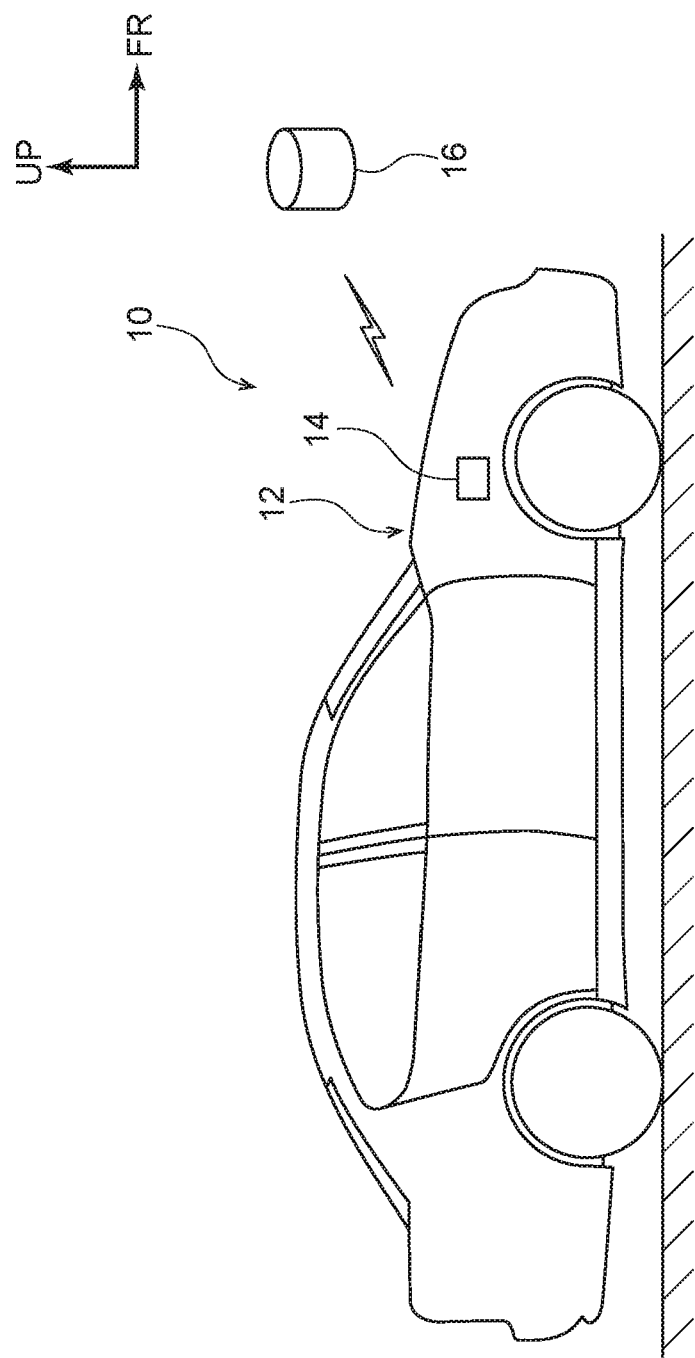
FIG. 1 is a perspective view illustrating schematic configuration of a vehicle notification system according to an exemplary embodiment.

Explanation follows regarding a vehicle notification system 10 according to an exemplary embodiment, with reference to the drawings. Note that the proportions in the drawings may be exaggerated to aid explanation and therefore differ from the actual proportions.

As illustrated in FIG. 1, a vehicle 12 installed with the vehicle notification system 10 according to the present exemplary embodiment includes an Electrical Control Unit (ECU) 14 serving as a control section. The ECU 14 is configured so as to be capable of communicating with a server 16 over the Internet.

The vehicle 12 of the present exemplary embodiment is what is referred to as a self-driving vehicle capable of automatic travel. The vehicle 12 is capable of switching between an occupant-driven mode in which an occupant drives, and a self-driving mode in which the vehicle 12 travels automatically.

Figure 2:
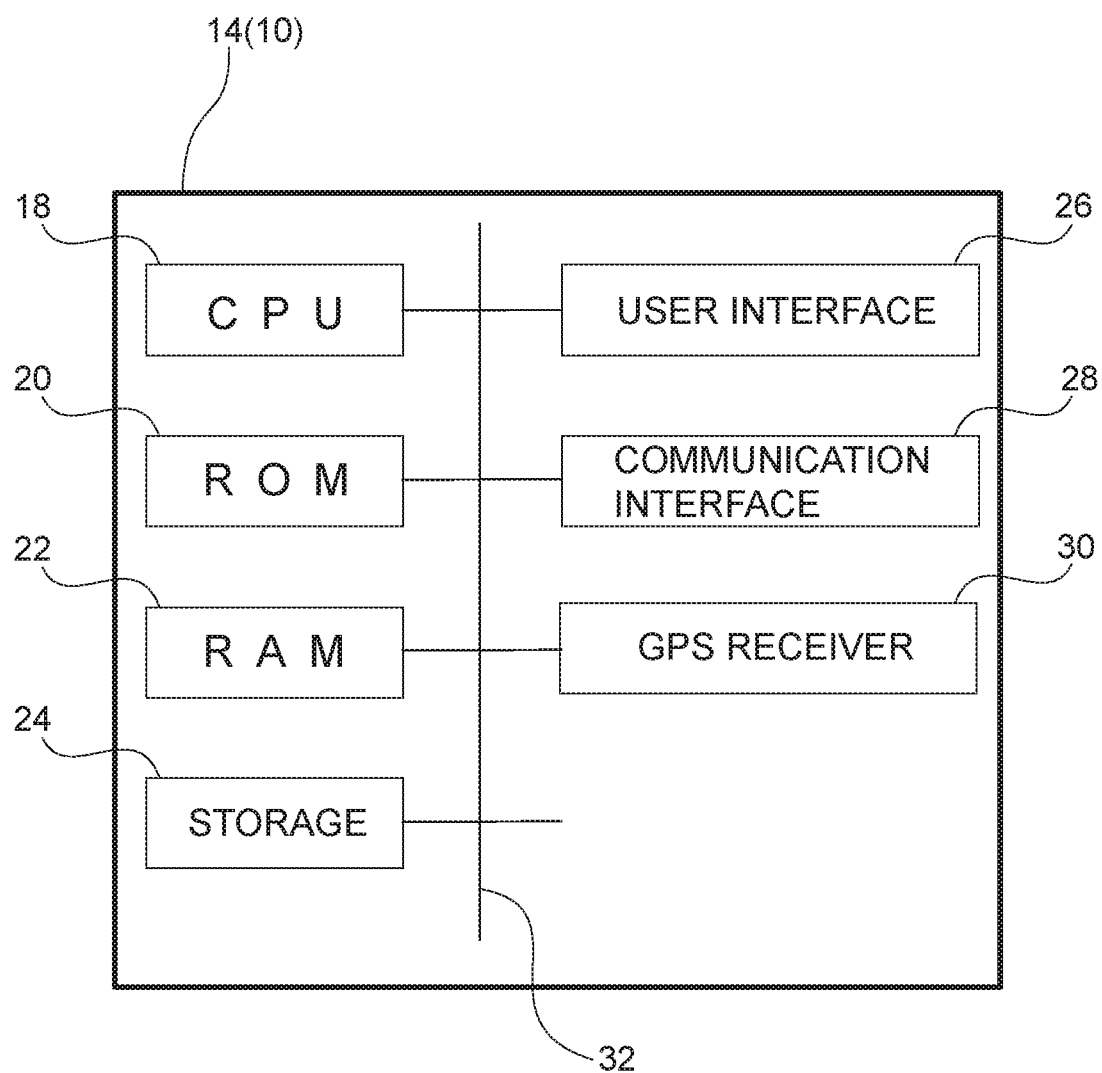
FIG. 2 is a block diagram illustrating hardware configuration of an ECU configuring a vehicle notification system according to an exemplary embodiment.

FIG. 2 is a block diagram illustrating hardware configuration of the ECU 14 configuring the vehicle notification system 10. As illustrated in FIG. 2, the ECU 14 is configured including a Central Processing Unit (CPU/Processor) 18, Read Only Memory (ROM) 20, Random Access Memory (RAM) 22, storage 24, a user interface 26, a communication interface 28, and a GPS receiver 30. The respective configurations are connected together so as to be capable of communicating with each other through a bus 32.

The CPU 18 is a central computation processing unit that executes various programs to control the respective sections. Namely, the CPU 18 reads a program from the ROM 20 or the storage 24, and executes the program using the RAM 22 as a workspace. The CPU 18 controls the various configurations and performs various computation processing according to the program recorded in the ROM 20 or the storage 24.

The ROM 20 holds various programs and various data. The RAM 22 is a workspace for temporary storage of programs or data. The storage 24 is configured by a Hard Disk Drive (HDD) or a Solid State Drive (SSD), and holds various data and various programs including an operating system.

The user interface 26 is an interface employed when an occupant of the vehicle 12 uses the vehicle notification system 10. For example, the user interface 26 includes a liquid crystal display provided with a touch-operated touch panel, an audio input section that accepts audio input, and an operable button.

The communication interface 28 is an interface which the ECU 14 uses to communicate with the server and other devices, and, for example, employs a protocol such as Ethernet (registered trademark), FDDI, or Wi-Fi (registered trademark).

The GPS receiver 30 receives GPS signals from plural satellites, and identifies the position of the vehicle 12 based on differences in the signal arrival times.

The vehicle notification system 10 employs the hardware resources illustrated in FIG. 2 to implement various functionality. Explanation follows regarding functional configuration implemented by the vehicle notification system 10, with reference to FIG. 3.

Figure 3:
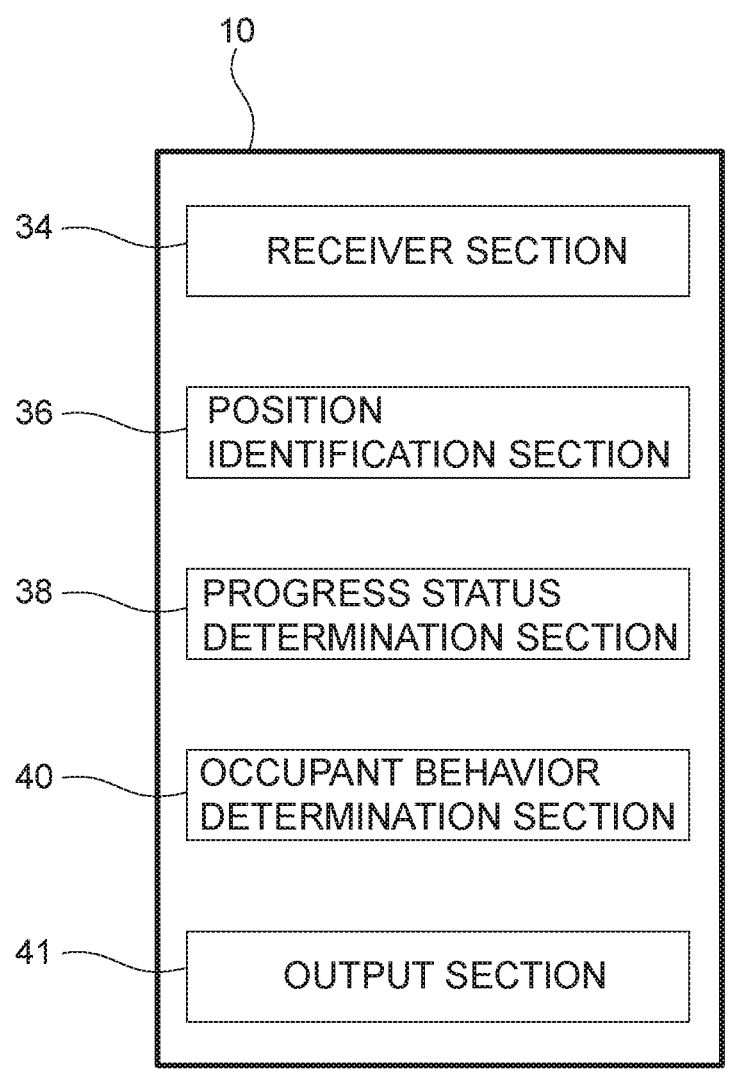
FIG. 3 is a block diagram illustrating functional configuration of a vehicle notification system according to an exemplary embodiment.

As illustrated in FIG. 3, functional configuration of the vehicle notification system 10 includes a receiver section 34, a position identification section 36, a progress status determination section 38, an occupant behavior determination section 40, and an output section 41. Each functional configuration is implemented by the CPU 18 of the ECU 14 reading a program stored in the ROM 20 or the storage 24, and executing the program.

The receiver section 34 receives signals such as map data transmitted by the server 16 and other external devices. The receiver section 34 also receives data relating to the surrounding environment of the vehicle 12 transmitted from an optical camera, a surroundings detection sensor, and the like. For example, the receiver section 34 receives data regarding the presence or absence of congestion on a travel route from the server 16.

The position identification section 36 identifies the current position of the vehicle 12 based on information from the GPS receiver 30, map data received from the receiver section 34, and the like.

The progress status determination section 38 determines whether or not the driving status of the vehicle 12 is conforming to plan, based on the current position of the vehicle 12 identified by the position identification section 36, and a preset destination. For example, the CPU 18 computes a travel route and a required length of time to the destination after self-driving has started at the stage when the destination is set by an occupant. Virtual representative points are set on the travel route, and predicted passage times are computed for these representative points. If the time at which a representative point is passed is later than planned, the progress status determination section 38 determines that the driving status is not conforming to plan. Note that although a threshold value for determining whether or not the driving status is conforming to plan is preset, such a threshold value may be set as desired by the occupant.

The occupant behavior determination section 40 detects occupant behavior using an in-cabin camera, a pulse rate meter, and the like. Specifically, the occupant behavior determination section 40 determines the direction of the gaze of the occupant and a wakefulness level.

The output section 41 performs audio notification regarding contents to be notified to the occupant through an in-cabin speaker. At the same time as audio notification, display may be performed using a display unit or the like provided to an instrument panel.

Next, explanation follows regarding a flow of notification processing by the vehicle notification system 10, with reference to the flowchart of FIG. 4. For example, the CPU 18 performs the notification processing by reading a program from the ROM 20 or the storage 24, expanding the program in the RAM 22, and executing the program.

FIG. 4 illustrates an example of a flow of notification processing when notifying the occupant of the driving status at regular intervals. As illustrated in FIG. 4, at step S102, the CPU 18 determines whether or not self-driving is ON. For example, when the vehicle starts self-driving in response to an operation by the occupant, a signal indicating that self-driving has started is transmitted to the ECU 14, and this signal may be employed to determine that self-driving is ON.

In cases in which the CPU 18 determines that self-driving is ON at step S102, processing transitions to step S104. In cases in which the CPU 18 does not determine that self-driving is ON at step S102, namely in cases in which self-driving is determined to be OFF, the processing of step S102 is repeated.

The CPU 18 starts a timer at step S104. The timer counts to a timing at which to perform occupant notification. After the CPU 18 has started the timer, processing transitions to step S106.

At step S106, the CPU 18 determines whether or not a representative point has been passed. Specifically, the CPU 18 sets one or plural points on the travel route as representative points at the stage when the travel route is decided. If the current position identified by the position identification section 36 based on data from the GPS receiver 30 is beyond the representative point, the representative point is determined to have been passed.

In cases in which the CPU 18 determines that the representative point has been passed at step S106, processing transitions to step S108. In cases in which the CPU 18 determines that the representative point has not been passed at step S106, namely in cases in which the representative point has not been reached, processing transitions to step S110.

At step S108, the CPU 18 announces to (notifies) the occupant that the representative point has been passed. Namely, the CPU 18 uses the output section 41 to perform audio notification regarding the driving status to the occupant through the speaker.

At step S110, the CPU 18 determines whether or not a predetermined length of time has elapsed. Namely, the predetermined length of time is determined to have elapsed in cases in which a predetermined count has been reached since starting the timer at step S104.

In cases in which the CPU 18 determines that the predetermined length of time has elapsed at step S110, processing transitions to step S112. In cases in which the CPU 18 determines that the predetermined length of time has not elapsed at step S110, processing returns to step S106.

At step S112, the CPU 18 notifies the occupant of the driving status. Namely, the CPU 18 uses the output section 41 to perform audio notification to the occupant regarding whether the driving status is on schedule or behind schedule through the speaker, and ends the notification processing.

As described above, in the notification processing of the present exemplary embodiment, notification that the driving status is conforming to plan is performed at regular intervals, and notification that a representative point has been passed is also performed.

Operation

Explanation follows regarding operation of the present exemplary embodiment.

As described above, in the vehicle notification system 10 of the present exemplary embodiment, audio notification regarding the driving status of the vehicle is performed for the occupant during self-driving. This enables the occupant to ascertain the driving status without looking at a display device such as a display unit during self-driving. This thereby enables the occupant to be effectively notified of the driving status during self-driving.

Moreover, in the present exemplary embodiment, notification that the driving status is conforming to plan is performed at regular intervals, enabling the occupant to ascertain the driving status at regular intervals. This enables anxiety felt due to not knowing the driving status to be allayed.

Note that although explanation has been given regarding notification processing to notify the occupant regarding the driving status at regular intervals in the present exemplary embodiment, there is no limitation thereto, and other notification may be performed. For example, the notification processing illustrated in FIG. 5 and FIG. 6 may be provided.

First Modified Example

Explanation follows regarding a first modified example of a flow of notification processing by the vehicle notification system 10, with reference to the flowchart of FIG. 5. For example, the CPU 18 performs notification processing by reading a program from the ROM 20 or the storage 24, expanding the program in the RAM 22, and executing the program.

At step S202, the CPU 18 determines whether or not self-driving is ON. In cases in which the CPU 18 determines that self-driving is ON at step S202, processing transitions to step S204. In cases in which the CPU 18 does not determine that self-driving is ON at step S202, namely in cases in which self-driving is determined to be OFF, the processing of step S202 is repeated.

At step S204, the CPU 18 detects behavior of the occupant. Specifically, the expression and gaze direction of the occupant are detected by the in-cabin camera or the like, and then processing transitions to step S206.

At step S206, the CPU 18 determines whether or not the occupant is facing toward the vehicle front. Namely, in cases in which the gaze direction of the occupant is detected to be facing toward the vehicle front based on an image captured by the in-cabin camera, the occupant is determined to be facing toward the vehicle front.

In cases in which the CPU 18 determines that the occupant is facing toward the vehicle front at step S206, processing transitions to step S208. In cases in which the CPU 18 determines that the occupant is not facing toward the vehicle front at step S206, processing transitions to step S210.

At step S208, the CPU 18 notifies the occupant of the driving status of the vehicle 12. Namely, the CPU 18 uses the output section 41 to perform audio notification to the occupant regarding whether the driving status is on schedule or behind schedule through the speaker. The CPU 18 then transitions to the processing of step S210.

At step S210, the CPU 18 determines whether or not the occupant has fallen asleep. Specifically, the CPU 18 uses the functionality of the occupant behavior determination section 40 to determine that the occupant has fallen asleep in cases in which the eyes of the occupant have remained in a closed state for a predetermined length of time or longer, based on information received from the in-cabin camera or the like. Alternatively, a biometric sensor such as a pulse monitor that measures the pulse rate of the occupant may be provided, and a sleeping state may be determined based on information from the biometric sensor.

In cases in which the CPU 18 determines that the occupant has fallen asleep at step S210, processing transitions to step S212. In cases in which the CPU 18 determines that the occupant has not fallen asleep at step S210, processing transitions to step S204, and the behavior of the occupant is detected again.

At step S212, the CPU 18 halts audio notification of the driving status to the occupant. Note that the type of notification to be halted may be set as desired. For example, notification that the driving status is on schedule may be halted, whereas notification is performed when the driving status is behind schedule.

At step S214, the CPU 18 determines whether or not the occupant has woken up. Specifically, similarly to when a sleeping state is determined, the CPU 18 uses the functionality of the occupant behavior determination section 40 to determine that the occupant has woken up in cases in which the eyes of the occupant have remained in an open state for a predetermined length of time or longer, based on information received from the in-cabin camera or the like.

In cases in which the CPU 18 determines that the occupant has woken up at step S214, processing transitions to step S216. In cases in which the CPU 18 determines that the occupant has not woken up at step S214, namely in cases in which a sleeping state is ongoing, processing transitions to step S210.

At step S216, the CPU 18 notifies the occupant of the driving status. Namely, the CPU 18 uses the output section 41 to perform audio notification regarding the driving status for the occupant through the speaker. The notification processing is then ended.

In the notification processing according to the present modified example, the occupant is able to ascertain the driving status simply by turning their gaze toward the vehicle front if they are concerned about the driving status.

By halting at least some notifications when determination is made that the occupant has fallen asleep, the sleeping occupant is not disturbed. This enables occupant comfort during self-driving to be improved.

Moreover, even if the occupant is in a sleeping state, if the driving status is no longer conforming to plan, the occupant can be woken up by notification that the driving status is not conforming to plan. This enables changes to the travel route or schedule changes to be performed speedily.

Moreover, by notifying the occupant of the driving status at a timing when the occupant has woken up, the occupant is able to ascertain how far the vehicle has traveled whilst they were asleep.

Second Modified Example

Explanation follows regarding a second modified example of a flow of notification processing by the vehicle notification system 10, with reference to the flowchart of FIG. 6. For example, the CPU 18 performs notification processing by reading a program from the ROM 20 or the storage 24, expanding the program in the RAM 22, and executing the program.

At step S302, the CPU 18 determines whether or not self-driving is ON. In cases in which the CPU 18 determines that self-driving is ON at step S302, processing transitions to step S304. In cases in which the CPU 18 does not determine that self-driving is ON at step S302, namely in cases in which self-driving is determined to be OFF, the processing of step S302 is repeated.

At step S304, the CPU 18 determines whether or not the vehicle 12 is going to make a left or right turn at an intersection. Namely, determination is made as to whether or not a left or right turn is to be made in cases in which the vehicle 12 has reached a predetermined distance from an intersection where left or right turns can be performed, based on a preset travel route and the current position.

In cases in which the CPU 18 determines that a left or right turn is to be performed at step S304, processing transitions to step S306. In cases in which the CPU 18 determines that a left or right turn will not be performed at step S304, namely when traveling straight ahead, processing transitions to step S308.

At step S306, the CPU 18 notifies the occupant of the driving status of the vehicle 12. Namely, the CPU 18 uses the output section 41 to perform audio notification regarding the right turn or left turn to the occupant through the speaker. The CPU 18 then transitions to the processing of step S308.

At step S308, the CPU 18 determines whether or not the vehicle 12 is changing speed. Specifically, the vehicle 12 is determined to be changing speed in cases in which the vehicle 12 is accelerating or decelerating, based on data relating to the surrounding environment of the vehicle 12 received from an optical camera, a surroundings detection sensor, or the like.

In cases in which the CPU 18 determines that the vehicle 12 is changing speed at step S308, processing transitions to step S310. In cases in which the CPU 18 determines that the speed is not changing at step S308, the notification processing is ended.

At step S310, the CPU 18 notifies the occupant of the driving status of the vehicle 12. Namely, the CPU 18 uses the output section 41 to perform audio notification regarding the acceleration or deceleration for the occupant through the speaker. The notification processing is then ended.

In the notification processing according to the present modified example, the occupant is notified of at least one action out of acceleration, deceleration, a right turn, and a left turn prior to this action being performed, enabling the occupant to prepare for the behavior of the vehicle. This enables anxiety felt by the occupant caused by a change in speed or a right or left turn to be allayed.

Note that in the present modified example, a threshold value for notifying regarding acceleration or deceleration may be set as desired. For example, by notifying the occupant in cases in which acceleration in excess of a predetermined acceleration is predicted, and not notifying the occupant in cases in which the predicted acceleration is the predetermined acceleration or below, excessively frequent notifications can be suppressed.

Although explanation has been given regarding an exemplary embodiment and modified examples, obviously various modifications are possible within a range not departing from the spirit of the present disclosure. For example, notification processing combining the exemplary embodiment and the modified examples described above may be performed. Namely, configuration may be made in which the driving status is notified at regular intervals each time a predetermined length of time has elapsed, with the driving status being notified in cases in which the occupant faces the vehicle front and in cases in which the occupant is awake.

In the exemplary embodiment described above, in cases in which the driving status is no longer conforming to plan, the reason for this may also be notified. For example, in cases in which the driving status has gone off plan due to road congestion, this may be notified.

Moreover, the processing that is executed by the CPU 18 reading software (programs) in the above exemplary embodiment may be executed by various processors other than a CPU. Examples of such processors include a Programmable Logic Device (PLD) in which circuit configuration can be modified post-manufacture, such as a Field-Programmable Gate Array (FPGA), or a specialized electric circuit that is a processor with a specifically-designed circuit configuration for executing specific processing, such as an Application Specific Integrated Circuit (ASIC). The above processing may be executed by a single one of such processors, or may be executed by a combination of two or more processors of the same type or different types (for example, by plural FPGAs, or a combination of a CPU and an FPGA). More specific examples of hardware structures of such processors include electric circuits configured by combining circuit elements such as semiconductor devices.

Moreover, in the above exemplary embodiment, the storage 24 serves as a recording section. However, there is no limitation thereto. For example, a recording section may be configured by a recording medium such as a Compact Disc (CD), a Digital Versatile Disc (DVD), or Universal Serial Bus (USB) memory.

What is claimed is:

1. A vehicle notification system comprising:
a CPU; and
a program stored in a memory that, when executed by the CPU, causes the vehicle notification system to:
perform audio notification regarding a driving status of a vehicle that is capable of self-driving, for an occupant of the vehicle at a predetermined timing during self-driving;
receive a travel route;
set one or more representative points on the travel route;
determine whether a representative point of the one or more representative points has been passed;
output a notification indicating that the representative point of the one or more representative points has been passed in response to determination that the representative point has been passed;
determine a wakefulness level of the occupant;
halt outputting a predetermined audio notification among different types of audio notifications until it is determined that the occupant has woken up in response to determination that the occupant has fallen asleep; and
output the predetermined audio notification in response to determination that the occupant has fallen asleep and determination that the driving status of the vehicle is behind schedule.

2. The vehicle notification system of claim 1, wherein the program, when executed by the CPU, causes the vehicle notification system to identify a current position of the vehicle;
determine whether the driving status is conforming to a plan based on a destination and the current position;

output a notification that the driving status is conforming to a plan at regular intervals in response to determination that the driving status is conforming to the plan, and output a notification that the driving status is not conforming to the plan is performed in response to determination that the driving status is no longer conforming to the plan.

3. The vehicle notification system of claim 1, wherein the occupant is notified of at least one action of acceleration, deceleration, a right turn, or a left turn, prior to the at least one action being performed.

4. The vehicle notification system of claim 1, wherein the program, when executed by the CPU, causes the vehicle notification system to perform the notification regarding the driving status in a case in which the occupant is facing toward a vehicle front side.

5. The vehicle notification system of claim 1, wherein the program, when executed by the CPU, causes the vehicle notification system to:

compute a predicted passage time for the one or more representative points;

detect an actual time when the vehicle passed the representative point;

determine whether the actual time is later than the predicted passage time for the representative point; and output a notification that the driving status is not conforming to the plan.

* * * * *